Dec. 11, 1923.
R. C. McNEILL
COMBINED SLED AND COASTER
Filed Nov. 4, 1922
1,477,513
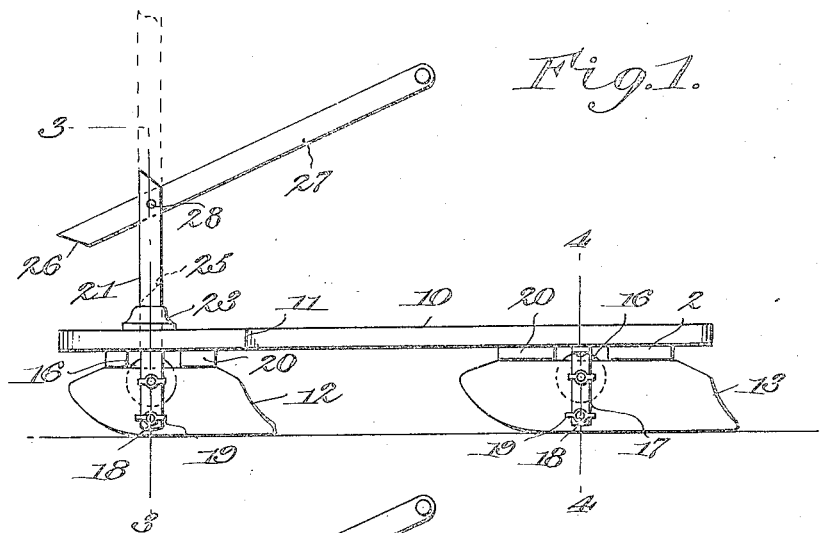
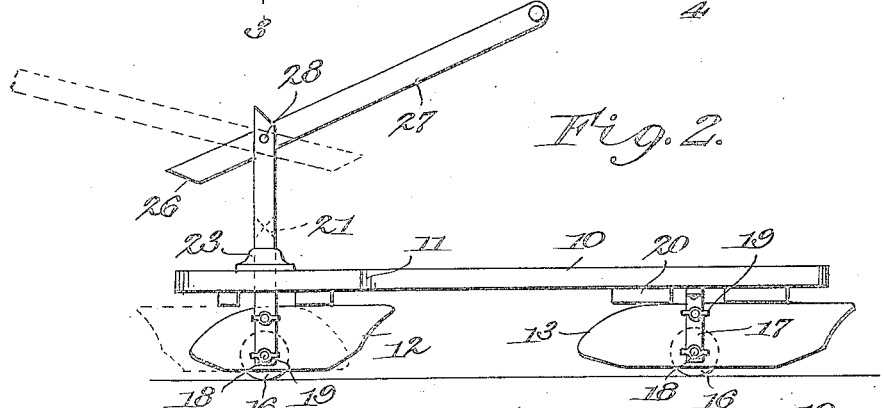
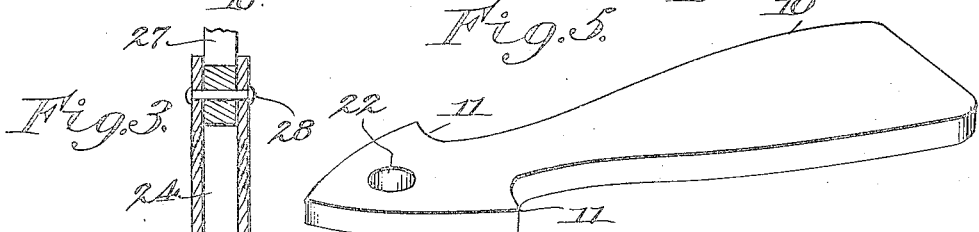
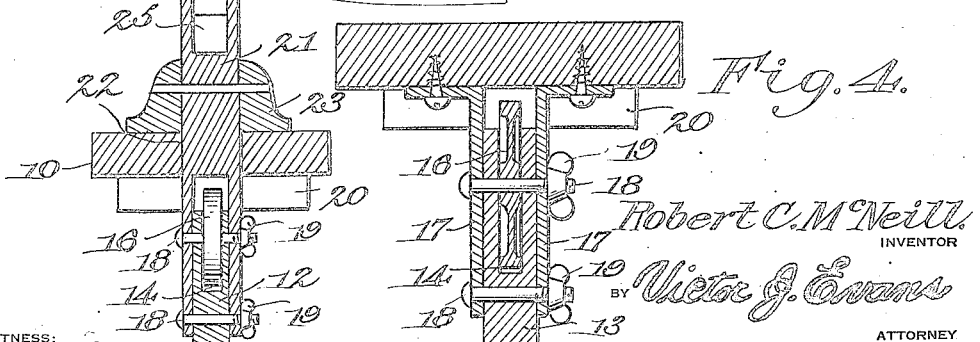

Patented Dec. 11, 1923.

1,477,513

UNITED STATES PATENT OFFICE.

ROBERT C. McNEILL, OF JERSEY CITY, NEW JERSEY.

COMBINED SLED AND COASTER.

Application filed November 4, 1922. Serial No. 599,088.

*To all whom it may concern.*

Be it known that I, ROBERT C. MCNEILL, a citizen of the United States, residing at Jersey City, in the county of Hudson and State of New Jersey, have invented new and useful Improvements in a Combined Sled and Coaster, of which the following is a specification.

This invention relates to a combined sled and coaster.

The primary object of the invention is the provision of a device capable of being used as a sled upon ice or snow or as a coaster for use upon the ground.

Another object of the invention resides in a device of the type mentioned including demountable runners having rollers carried thereby, whereby upon the inverting of the same will change the sled into a coaster or vice versa.

A further object resides in the provision of a combined sled and coaster of a novel design and means whereby the same may be guided from either a sitting or standing position, and also capable of use when it is desired to pull the device along the ground.

A still further object of the invention is to provide a combined sled and coaster which is simple in construction, cheap to manufacture and easily changed from one form of the device to the other.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation showing the device in use as a sled.

Figure 2 is a similar view but showing the device when used as a coaster, the dotted lines illustrating the position of the handle for pulling purposes.

Figure 3 is a vertical sectional view on the line 3—3 of Figure 1.

Figure 4 is a similar view on the line 4—4 of Figure 1.

Figure 5 is a detail perspective view of the platform.

Referring more particularly to the drawings, the reference numeral 10 designates a platform which in plan resembles an arrow, but it is to be understood that various other designs may be used if desired. The platform 10 is provided with foot rests 11 at a point where the body of the arrow merges into the head. Arranged centrally and longitudinally beneath the platform is a front runner 12 and a rear runner 13, the said runners being identical in construction and for this reason a description of one will suffice.

Each runner includes a recessed portion 14 adapted to receive a roller 16 mounted for rotation therein. The rear runner 13 is rigidly secured to the platform 10 by means of brackets 17, the legs of said brackets extending downwardly and secured to the runner 13 by means of bolts 18, the free ends of which receive thumb nuts 19, one of said bolts 18 serving as a shaft for the rollers 16. As stated above the runners 12 and 13 are identical in construction but instead of the front runner 12 being rigidly mounted to the platform 10 by means of the brackets 17, the same is mounted for rotation in the bifurcation 20 of the steering post 21. Cleats 22 are secured to the underside of the platform and serve to prevent rocking movement of said runners when travelling over uneven surfaces.

The steering post 21 has its bearing in an opening 22 in the platform 10 and is provided with a collar 23, the upper portion of the steering post having a bifurcation 24. The lower wall of the bifurcation 24 is beveled as at 25 for co-action with the beveled portion 26 of the handle 27, said handle being pivotally mounted as at 28 in the bifurcation 24. It will be seen by reference to Figure 1 that the handle 27 is shown in a position for guiding while in a sitting position, and in dotted lines for guiding while in a standing position, the beveled portion 26 of the handle abutting the beveled portion 25 of the steering post, which portion 25 acts as a stop for said handle. Should it be desired to pull the device along the ground it is only necessary to revolve the steering post to a position as shown in dotted lines in Figure 2.

The operation for removing the runner to convert the sled to a coaster or vice versa is as follows:—

Remove the thumb nuts 19, withdraw the bolts 18, then invert the runner and replace the bolts 18 and thumb nuts 19.

Whereas there has been shown and described what is considered to be the preferred form of my invention, I wish it to be understood that changes, alterations and modifications as come within the claims may be resorted to when desired.

What I claim as new is:—

1. A combined sled and wheel coaster comprising a platform, a pair of brackets secured to said platform and depending therefrom, a rear runner interposed between said brackets and centrally of said platform, a steering post provided with a bifurcation, a front runner mounted in said bifurcation, securing elements for detachably securing said runners to said brackets and steering post respectively, a mortice in said runners, wheels in said mortices and mounted for rotation on certain of said securing elements.

2. A combined sled and wheel coaster comprising a platform, a pair of brackets secured to said platform and depending therefrom, a rear runner interposed between said brackets and centrally of said platform, a steering post provided with a bifurcation, a front runner mounted in said bifurcation, securing elements for detachably securing said runners to said brackets and steering post respectively, a mortice in said runners, wheels in said mortices and mounted for rotation on certain of said securing elements, and means secured transversely beneath said platform for preventing rocking movement of said runners.

3. A device of the class described comprising a platform, a stationary runner secured to said platform, a movable runner, guiding means carried by said platform, said guiding means supported by said movable runner, means for detachably connecting said runners whereby the runners may be inverted to convert a sled into a wheel coaster or vice versa.

4. A device of the class described comprising a platform, a stationary runner arranged beneath and to the rear of said platform, a roller carried by said runner, means for detachably connecting said runner with said platform, a steering post, a runner detachably connected to said steering post, a roller carried by said runner whereby the runners may be inverted to convert a sled into a wheel coaster or vice versa.

In testimony whereof I have affixed my signature.

ROBERT C. McNEILL.